US009995232B2

United States Patent
Khafagy et al.

(10) Patent No.: US 9,995,232 B2
(45) Date of Patent: Jun. 12, 2018

(54) METHOD AND SYSTEM FOR OPERATING AN ENGINE START-STOP SYSTEM IN A VEHICLE

(71) Applicant: Ford Global Technologies, LLC, Dearborn, MI (US)

(72) Inventors: Hafiz Shafeek Khafagy, Dearborn, MI (US); Chad Everette Griffin, Pinckney, MI (US); Kevin Muncy, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 15/213,604

(22) Filed: Jul. 19, 2016

(65) Prior Publication Data

US 2018/0023493 A1  Jan. 25, 2018

(51) Int. Cl.
| | |
|---|---|
| F02N 11/08 | (2006.01) |
| F02D 41/06 | (2006.01) |
| F02D 41/04 | (2006.01) |
| F16H 63/50 | (2006.01) |

(52) U.S. Cl.
CPC ......... *F02D 41/065* (2013.01); *F02D 41/042* (2013.01); *F02N 11/0814* (2013.01); *F02N 11/0818* (2013.01); *F02N 11/0825* (2013.01); *F02N 11/0833* (2013.01); *F16H 63/50* (2013.01); *F02N 2200/061* (2013.01); *F02N 2200/0802* (2013.01); *F02N 2200/0806* (2013.01); *F02N 2200/102* (2013.01)

(58) Field of Classification Search
None
See application file for complete search history.

(56) References Cited

U.S. PATENT DOCUMENTS

| | | | | |
|---|---|---|---|---|
| 6,504,259 B1 * | 1/2003 | Kuroda | ................... | B60K 6/46 180/65.25 |
| 8,690,731 B1 | 4/2014 | Sangameswaran et al. | | |
| 8,712,673 B2 | 4/2014 | Gwon et al. | | |
| 9,181,895 B2 | 11/2015 | Roberts et al. | | |
| 2002/0028726 A1 * | 3/2002 | Morimoto | ............... | F02D 17/04 477/102 |

(Continued)

FOREIGN PATENT DOCUMENTS

GB  2466188 A  6/2010

*Primary Examiner* — Justin Holmes
(74) *Attorney, Agent, or Firm* — David B. Kelley; Brooks Kushman P.C.

(57) ABSTRACT

A method to control engine start-stop in a vehicle is provided. The method includes outputting via a controller an engine command to auto-start the engine based on detection of a predetermined vehicle condition affecting fuel economy of the vehicle, detection of a shift from neutral to another gear position, and whether a predetermined time threshold has expired following the shift in response to detection of a presence of an engine auto-stop mode and a neutral gear position. The predetermined vehicle condition may be a movement of the vehicle in a reverse direction. The predetermined vehicle condition may be a battery parameter being outside of predetermined range. The predetermined range may be based on a battery state of charge, a battery temperature, a battery voltage, or a battery load current. The predetermined vehicle condition may be a HVAC component activation.

16 Claims, 4 Drawing Sheets

(56) References Cited

U.S. PATENT DOCUMENTS

| | | | |
|---|---|---|---|
| 2010/0076656 A1* | 3/2010 | Hiyoshi | B60W 10/06 701/70 |
| 2011/0166745 A1* | 7/2011 | Tiwari | B60W 50/0225 701/29.2 |
| 2014/0081561 A1* | 3/2014 | Be | B60W 50/085 701/112 |
| 2014/0088853 A1 | 3/2014 | Christen et al. | |
| 2014/0088854 A1 | 3/2014 | Smague | |
| 2014/0358359 A1* | 12/2014 | Yagi | F02N 11/0814 701/31.4 |
| 2015/0158480 A1* | 6/2015 | Rademacher | B60W 10/06 477/92 |
| 2015/0267628 A1* | 9/2015 | Bohn | F02N 11/0814 701/112 |
| 2015/0329119 A1* | 11/2015 | Sujan | F02D 41/08 701/54 |

* cited by examiner

| | Auto-Stop-Start in Neutral (SIN) 404 400 410 | | | | | | |
|---|---|---|---|---|---|---|---|
| | Pre Condition | | | Current Condition | | | |
| | Gear Position | Engine | Brake | Gear Position | Brake | Before Expiration of Predetermined Time Threshold | After Expiration of Predetermined Time Threshold |
| 1 | Neutral | Auto-stopped | Applied | Park | Applied | Remain Stop | Remain Stop |
| 2 | Neutral | Auto-stopped | Applied | Park | Released | Remain Stop | Remain Stop |
| 3 | Neutral | Auto-stopped | Applied | Reverse | Applied | Remain Stop | Auto-start |
| 4 | Neutral | Auto-stopped | Applied | Reverse | Released | Auto-start | Remain Running |
| 5 | Neutral | Auto-stopped | Applied | Neutral | Applied | Remain Stop | Remain Stop |
| 6 | Neutral | Auto-stopped | Applied | Neutral | Released | Remain Stop | Remain Stop |
| 7 | Neutral | Auto-stopped | Applied | Drive | Applied | Auto-start | Auto-stop |
| 8 | Neutral | Auto-stopped | Applied | Drive | Released | Auto-start | Remain Running |
| 9 | Neutral | Auto-stopped | Applied | Sport | Applied | Auto-start | Auto-stop |
| 10 | Neutral | Auto-stopped | Applied | Sport | Released | Auto-start | Remain Running |
| 11 | Neutral | Auto-stopped | Released | Park | Applied | Remain Stop | Remain Stop |
| 12 | Neutral | Auto-stopped | Released | Park | Released | Remain Stop | Remain Stop |
| 13 | Neutral | Auto-stopped | Released | Reverse | Applied | Remain Stop | Auto-start |
| 14 | Neutral | Auto-stopped | Released | Reverse | Released | Remain Stop | Remain Stop |
| 15 | Neutral | Auto-stopped | Released | Neutral | Applied | Remain Stop | Remain Stop |
| 16 | Neutral | Auto-stopped | Released | Neutral | Released | Remain Stop | Remain Stop |
| 17 | Neutral | Auto-stopped | Released | Drive | Applied | Auto-start | Auto-stop |
| 18 | Neutral | Auto-stopped | Released | Drive | Released | Auto-start | Remain Running |
| 19 | Neutral | Auto-stopped | Released | Sport | Applied | Auto-start | Auto-stop |
| 20 | Neutral | Auto-stopped | Released | Sport | Released | Auto-start | Remain Running |
| 21 | Neutral | Running | Applied | Park | Applied | Remain Running | Auto-stop |
| 22 | Neutral | Running | Applied | Park | Released | Remain Running | Auto-stop |
| 23 | Neutral | Running | Applied | Reverse | Applied | Remain Running | Remain Running |
| 24 | Neutral | Running | Applied | Reverse | Released | Remain Running | Remain Running |
| 25 | Neutral | Running | Applied | Neutral | Applied | Remain Running | Auto-stop |
| 26 | Neutral | Running | Applied | Neutral | Released | Remain Running | Auto-stop |
| 27 | Neutral | Running | Applied | Drive | Applied | Remain Running | Auto-stop |
| 28 | Neutral | Running | Applied | Drive | Released | Remain Running | Remain Running |
| 29 | Neutral | Running | Applied | Sport | Applied | Remain Running | Auto-stop |
| 30 | Neutral | Running | Applied | Sport | Released | Remain Running | Remain Running |
| 31 | Neutral | Running | Released | Park | Applied | Remain Running | Auto-stop |
| 32 | Neutral | Running | Released | Park | Released | Remain Running | Auto-stop |
| 33 | Neutral | Running | Released | Reverse | Applied | Remain Running | Remain Running |
| 34 | Neutral | Running | Released | Reverse | Released | Remain Running | Remain Running |
| 35 | Neutral | Running | Released | Neutral | Applied | Remain Running | Auto-stop |
| 36 | Neutral | Running | Released | Neutral | Released | Remain Running | Auto-stop |
| 37 | Neutral | Running | Released | Drive | Applied | Remain Running | Auto-stop |
| 38 | Neutral | Running | Released | Drive | Released | Remain Running | Remain Running |
| 39 | Neutral | Running | Released | Sport | Applied | Remain Running | Auto-stop |
| 40 | Neutral | Running | Released | Sport | Released | Remain Running | Remain Running |

*Fig-4*

METHOD AND SYSTEM FOR OPERATING AN ENGINE START-STOP SYSTEM IN A VEHICLE

TECHNICAL FIELD

This disclosure relates to a method and a system for operating an engine start-stop system in a motor vehicle.

BACKGROUND

Vehicles equipped with start-stop systems are powered in part by conventional internal combustion engines. A controller may initiate an automatic stop or start of the engine under certain operating conditions. For example, the start-stop system may automatically stop the engine when the vehicle is stopped or decelerating and the engine is not required for propulsion or other purposes. At a later time, the start-stop system may restart the engine when required for propulsion or other purposes, e.g., when the brake pedal is released and/or the accelerator pedal is engaged. By disabling the engine when possible, overall fuel consumption is reduced.

SUMMARY

A method to control engine start-stop in a vehicle includes outputting via a controller an engine command to auto-start the engine based on detection of a predetermined vehicle condition affecting fuel economy of the vehicle, detection of a shift from neutral to another gear position, and whether a predetermined time threshold has expired following the shift in response to detection of a presence of an engine auto-stop mode and a neutral gear position. The predetermined vehicle condition may be a movement of the vehicle in a reverse direction. The predetermined vehicle condition may be a battery parameter being outside of predetermined range. The predetermined range may be based on a battery state of charge, a battery temperature, a battery voltage, or a battery load current. The predetermined vehicle condition may be a HVAC component activation. The HVAC component activation may be a max defrost command, a max heat command, a max air conditioning command, or a max blower speed command. The predetermined vehicle condition may be a brake fault, a vehicle speed outside of a predetermined speed range, or a vehicle sensor fault. The predetermined vehicle condition may be the vehicle rolling backward or a high grade. The predetermined time threshold may be 200 to 300 milliseconds.

A method to control engine start-stop in a vehicle includes outputting via a controller an engine command to auto-start or remain in auto-stop mode based on detection of a predetermined vehicle condition affecting fuel economy of the vehicle, detection of a shift from the forward drive gear position to another gear position, and whether a predetermined time threshold has expired following the shift in response to detection of a presence of an engine auto-stop mode and a forward drive gear position. The engine command may be a remain in auto-stop mode command output in response to detecting a brake application released prior to expiration of the predetermined time threshold and a shift to a neutral gear position. In response to detection of an inhibit condition, the controller may output an auto-start engine command. The inhibit condition may be an ambient temperature being outside of a predetermined calibratable range, an engine temperature being outside of a predetermined engine temperature range, a transmission fluid temperature being outside of a predetermined transmission temperature range, a battery temperature being outside of a predetermined battery temperature range, or a driver-dependent condition. In response to not detecting an inhibit condition, the controller may output an auto-start engine command if the gear position has shifted to drive. The engine command may be an auto-start command output in response to detection of a brake application released after the predetermined time threshold and a shift to a neutral gear position.

A vehicle includes an engine, a transmission, and a controller. The transmission selectively couples to the engine. The controller is programmed to, in response to detecting whether a brake application extends beyond a predetermined time threshold and whether a gear selector is in a neutral gear position, output an auto-start command to couple the transmission and engine. The controller may be further programmed to, in response to detection of presence of an inducement condition, output an engine auto-start command. The inducement condition may be an ambient temperature being outside of a predetermined calibratable range, an engine temperature being outside of a predetermined engine temperature range, a transmission fluid temperature being outside of a predetermined transmission temperature range, a battery temperature being outside of a predetermined battery temperature range, or a driver-dependent condition. The predetermined time threshold may be 200 to 300 milliseconds. The controller may be further programmed to, in response to detection of a gear shift from the neutral gear to reverse or park, output an engine auto-start command.

BRIEF DESCRIPTION OF THE DRAWINGS

FIG. 4 is a matrix illustrating an example of a control strategy for engine auto start-stop operations of a vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
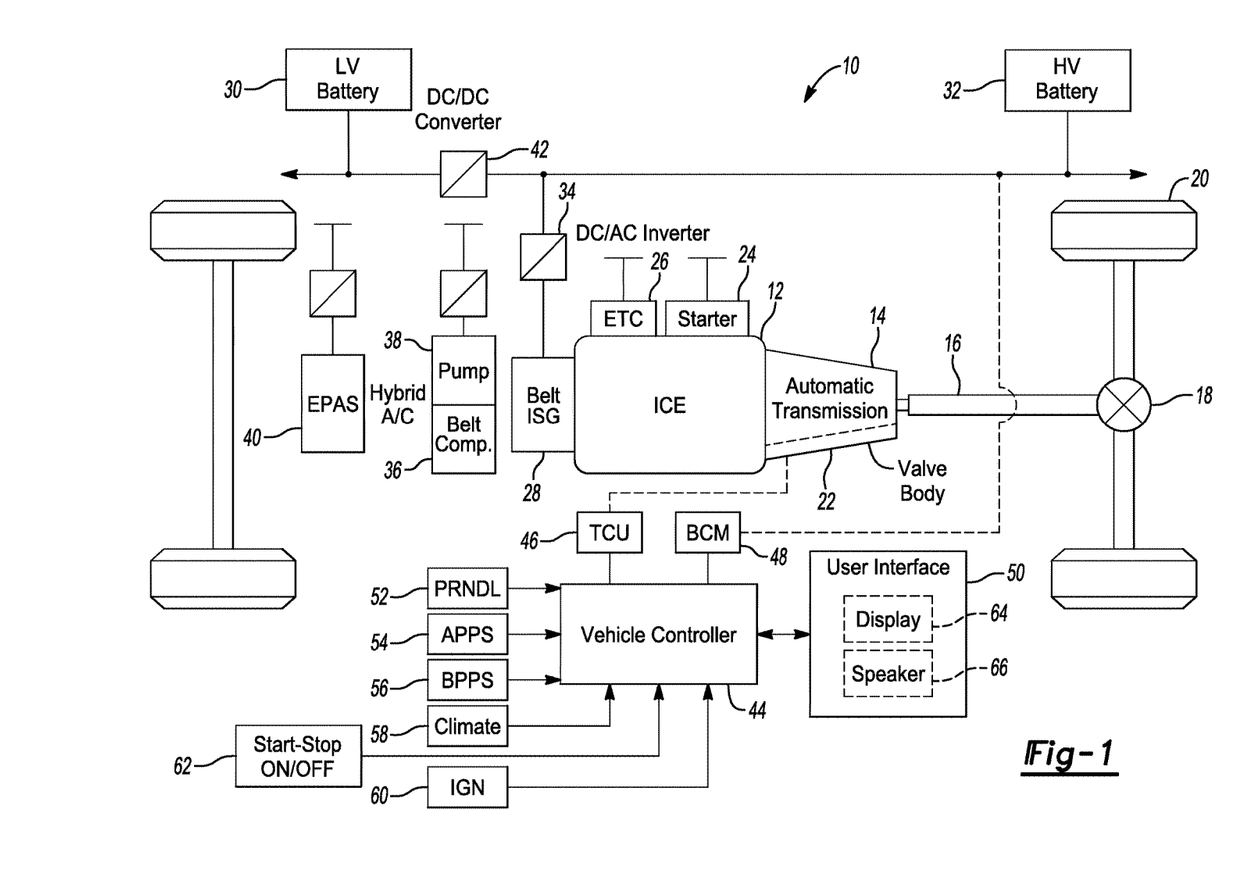
FIG. 1 is a schematic diagram illustrating an example of a vehicle.

FIG. 1 shows a schematic diagram of a vehicle, referred to as a vehicle 10 herein. The vehicle 10 includes an internal combustion engine 12 and an automatic transmission 14. Torque delivered from a crankshaft of the internal combustion engine 12 is delivered through multiple-ratio gearing of the transmission 14 to a driveshaft 16 and to a final drive differential-and-axle assembly 18 for traction wheels 20. The gearing for the transmission 14 may establish multiple torque ratios under the control of a valve body 22. The ratios may be established by an engagement and disengagement of clutches and brakes in a conventional fashion. The transmission 14 may be configured for a neutral state by disengaging a forward drive clutch. A starter motor 24 under the control of a low-voltage battery (not shown) can be used to start the engine 12 under cold-start conditions. The vehicle 10 may also include an electronic throttle control 26 for the engine 12. While vehicle 10 is depicted with an automatic transmission, one or more embodiments of the present application may also be employed in vehicles having manual transmissions.

The vehicle 10 may include an automatic start-stop system that automatically shuts down and restarts the engine 12 to reduce an amount of time the engine spends idling, thereby reducing fuel consumption and emissions. Automatically shutting down the engine may be advantageous for vehicles that spend significant amounts of time waiting at traffic lights or frequently come to a stop in traffic jams. While the automatic start-stop feature is present in HEVs, automatic start-stop systems may also appear in vehicles that lack a hybrid electric powertrain.

The vehicle 10 may enter an auto-stop mode (i.e., the engine is auto-stopped) when certain vehicle propulsion conditions are met, such as when the driver has applied the brakes and the vehicle speed is below a predetermined speed threshold. Once the driver indicates a request for vehicle propulsion (e.g., by releasing the brake pedal), a powertrain controller may automatically restart the engine 12.

To this end, the engine 12 may be drivably connected to a crankshaft pulley, which drives a belt-driven integrated starter-generator 28 in one or more embodiments of the present application. Although a belt-drive is disclosed, other types of drives could be used to provide a driving connection between the engine 12 and the starter-generator 28. For example, a flexible chain drive or a geared drive could be used, depending on design choice. The starter-generator 28 may be electrically coupled to a voltage source, such as a low-voltage battery 30 or a high-voltage battery 32. The high-voltage battery 32 may be connected to the starter-generator 28 through a DC/AC inverter 34.

Since automobile accessories like air conditioners and water pumps have typically been designed to run off a serpentine belt on an engine, those systems need to be redesigned to function properly when the engine is turned off. In full HEVs, an electric motor is typically used to power these devices instead. In vehicle 10, hybrid vehicle accessories, such as an air conditioning compressor 36, a fuel pump 38 and a power steering pump 40, may be electrically powered by the low-voltage battery 30. The voltage sources may be separated by a DC/DC converter 42, which may adjust, or "step down" the voltage level to allow the high-voltage battery 32 to charge the low-voltage battery 30.

A vehicle control system, shown generally as a vehicle controller 44, may be provided to control various components and subsystems of the vehicle 10, including the automatic start-stop system. The vehicle controller 44 may be a general vehicle controller, such as a vehicle system controller (VSC). Although it is shown as a single controller, the vehicle controller 44 may include multiple controllers or may include multiple software components or modules embedded in a single controller to control various vehicle systems, sub-systems, and components. For example, the vehicle controller 44 may include the powertrain controller to control various aspects of the micro-hybrid powertrain. The powertrain controller could be a separate hardware device, or may include a separate powertrain control module (PCM), which could be software embedded within a general purpose controller, such as the VSC. The vehicle controller 44 may generally include any number of microprocessors, ASICs, ICs, memory (e.g., FLASH, ROM, RAM, EPROM and/or EEPROM) and software code to co-act with one another to perform a series of operations.

The vehicle controller 44 may communicate with other controllers over a vehicle-wide network, such as a controller area network (CAN). The CAN may be a hardline vehicle connection (e.g., bus) and may be implemented using any number of communication protocols. For example, the vehicle controller 44 may communicate with a transmission control unit (TCU) 46 and a battery control module (BCM) 48, which is electrically coupled to the high-voltage battery 32. Alternatively, the aforementioned controllers may be software control modules contained within the vehicle controller 44 or other general purpose controllers residing on the vehicle. Some or all of these various controllers or software control modules can make up a control system in accordance with the present application. It will be appreciated, however, that various aspects of the disclosed subject matter are not limited to any particular type or configuration of the vehicle controller 44, or to any specific control logic for managing operation of the micro-hybrid powertrain or other vehicle systems.

The vehicle controller 44 may communicate with each individual vehicle system to monitor and control vehicle operation according to programmed algorithms and control logic. In this regard, the vehicle controller 44 may help manage the different energy sources available and the engine status in order to optimize fuel economy and/or maximize the vehicle's range. The vehicle controller 44 may include a programmable digital computer and suitable input/output circuitry or the like that is configured to receive the various input signals indicative of a condition of the vehicle system components. The input signals may be communicated from the vehicle system components themselves, or device-specific controllers, or may be received from various vehicle system sensors, antennas, or manual inputs, such as those described above. The vehicle controller 44 may process these input signals and others according to logic rules to monitor and control operation of the micro-hybrid powertrain.

In addition to the foregoing, the vehicle 10 may include a user interface 50 to facilitate communications with a driver. The user interface may communicate with the vehicle controller 44 and may provide relevant vehicle content to the driver. The vehicle controller 44 may be configured to receive input signals that are indicative of current operating and/or environmental conditions of the vehicle 10, including signals relevant to the operation of the automatic start-stop system. For example, the vehicle controller 44 may receive input signals from the TCU 46 and the BCM 48, as well as a gear selector (PRNDL) 52, an accelerator pedal position sensor (APPS) 54, a brake pedal position sensor (BPPS) 56, a climate control module 58, an ignition switch (IGN) 60, and an automatic start-stop switch 62, or the like. The automatic start-stop switch 62 can allow the driver to manually deactivate the automatic start-stop system, thereby preventing engine auto-stops at the driver's request. The vehicle controller 44 may provide output to the user interface 50 such that the user interface 50 conveys vehicle operating information, such as information relating to the operation of the automatic start-stop system, to the driver. The user interface 50 may communicate relevant vehicle information to a driver visually through a display 64 and/or audibly via a speaker 66.

The display 64 may be electrically connected to a display controller (not shown). The display controller may communicate with the powertrain controller, the TCU 46, the BCM 48, and other dedicated or general purpose controllers, such as the vehicle controller 44. The display controller may gather data from various vehicle systems and components, which may be accessed via the CAN. Moreover, the display controller may provide data to the display 64 for conveying vehicle operation information to the driver in a meaningful manner. Signals output from the various vehicle systems and components may be processed, and display computations may be carried out, in the vehicle controller 44, the display controller or the display 64, or some combination thereof. The display controller may be a separate controller or may be integrated with the vehicle controller 44 or another general or dedicated vehicle controller. Thus, as with the powertrain controller, all monitoring, processing and control operations that may be performed by a separate display controller may be described herein as being carried out by the vehicle controller 44. In addition to the automatic start-stop switch 62, the vehicle controller 44 may automatically prevent engine auto-stops during certain operating conditions.

Figure 2:
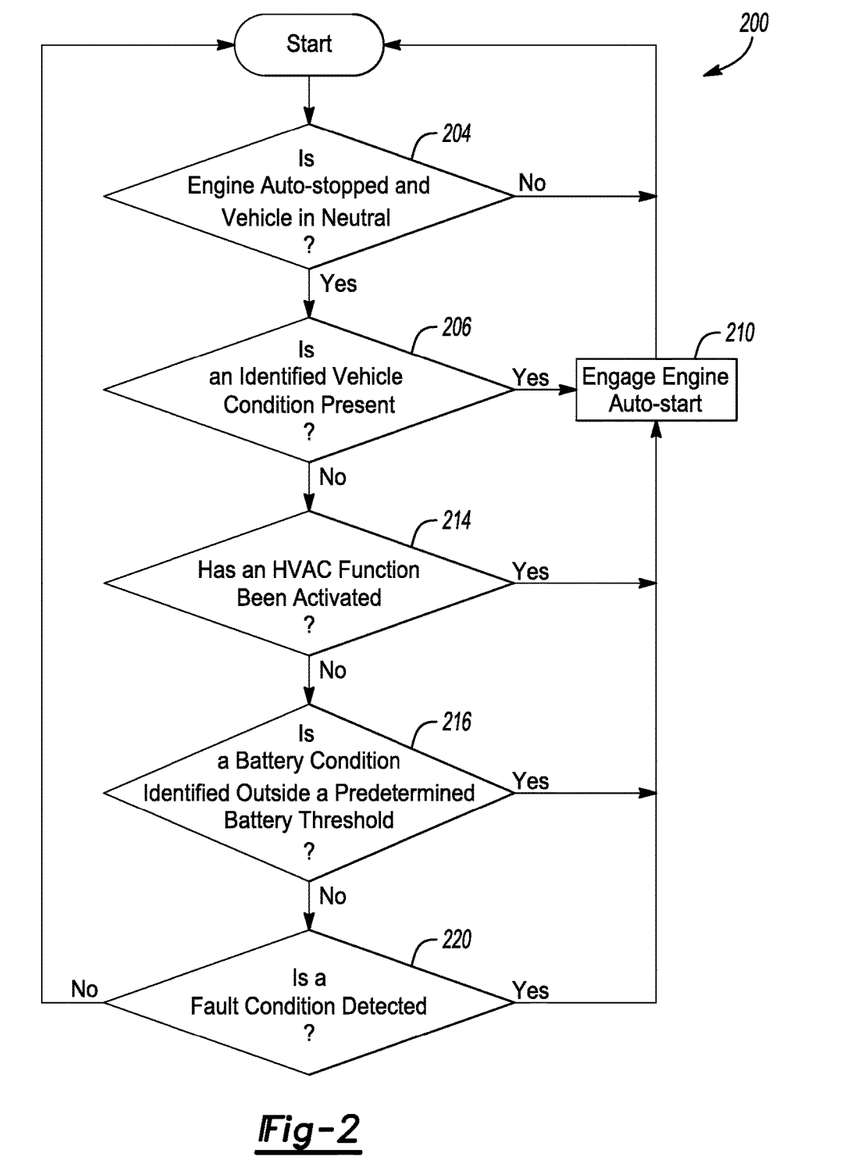
FIG. 2 is a flow chart illustrating an example of an algorithm to support engine auto start-stop operations of a vehicle.

Control strategies may assist in directing initiation of start-stop engine commands based on a detection of certain conditions. FIG. 2 shows an example of an algorithm supporting engine auto start-stop operations of a vehicle, referred to as an algorithm 200 herein. The algorithm 200 may be used with various vehicle configurations such as a vehicle including a traditional PRNDL system, a non-pushbutton shift by wire system, and a push button shift by wire system.

The algorithm 200 may be representative of programming for a controller to operate the vehicle. For example, in operation 204, the controller of the vehicle may determine whether the engine is engaged in an auto-stop mode and whether the vehicle is operating in a neutral gear position. One or more sensors may be located throughout the vehicle to detect a variety of conditions of vehicle components. The one or more sensors may be in communication with the controller to deliver signals indicating detection or no detection of the conditions. In the event auto-stop mode of the engine is engaged and the vehicle is in a neutral gear position, the controller may determine whether one or more of identified vehicle conditions are present in operation 206. Identified vehicle conditions include conditions in which additional power may be needed for vehicle operations as a result of an occurrence of the identified vehicle condition. Examples of the identified vehicle conditions include whether or not the vehicle begins to roll backwards or whether a grade above a predetermined grade threshold is present. An example of the predetermined grade threshold includes a 15% grade or a 20% grade. In the event one of the identified vehicle conditions is detected, the controller may direct engagement of the engine auto-start in operation 210.

If none of the identified vehicle conditions is detected, the controller may determine whether one of a group of preselected HVAC operations has been activated in operation 214. Preselected HVAC operations include operations in which additional power may be needed for vehicle operations as a result of an occurrence of the preselected HVAC operation. Examples of preselected HVAC operations include a max defrost command, a max heat command, a max air conditioning command, or a max blower speed command. Each of these commands are typically initiated by a driver, though one or more of the commands may be initiated as a result of a vehicle event, such as a remote vehicle start. In the event activation of one of the preselected HVAC operations is detected, the controller may direct engagement of the engine auto-start in operation 210.

If none of the preselected HVAC operations are detected as being activated, the controller may determine whether a battery condition exits outside of predetermined battery condition thresholds in operation 216. Predetermined battery condition thresholds may relate to thermal and charge conditions of a vehicle high voltage battery in which additional power may be needed for vehicle operations as a result of an occurrence of one of the battery conditions. Examples of the battery conditions may include a battery power level outside of a predetermined power level threshold, a SOC of the battery outside of a predetermined state of charge threshold, or a state of health of the battery outside of a predetermined health threshold. An example of the predetermined power threshold may include a current load value of the battery equal to or greater than 70 amps or a voltage value of the battery equal or greater than 11.3 volts. An example of the predetermined SOC threshold may be an SOC value equal to or less than 67%. An example of the predetermined state of health threshold may be based on a function of available power or the SOC level. Each of the thresholds may be calibratable based on a type of transmission and brake system. In the event one of the battery conditions is detected outside of the respective threshold, the controller may direct engagement of the engine auto-start in operation 210.

If none of the battery conditions are detected outside of the respective threshold, the controller may determine whether a vehicle fault condition has occurred in operation 220. Vehicle fault conditions are conditions impacting drivability and/or performance. Examples of vehicle fault conditions include a brake fault, a subsystem fault, and a system control fault. In the event a vehicle fault condition is detected, the controller may direct engagement of the engine auto-start in operation 210.

Figure 3:
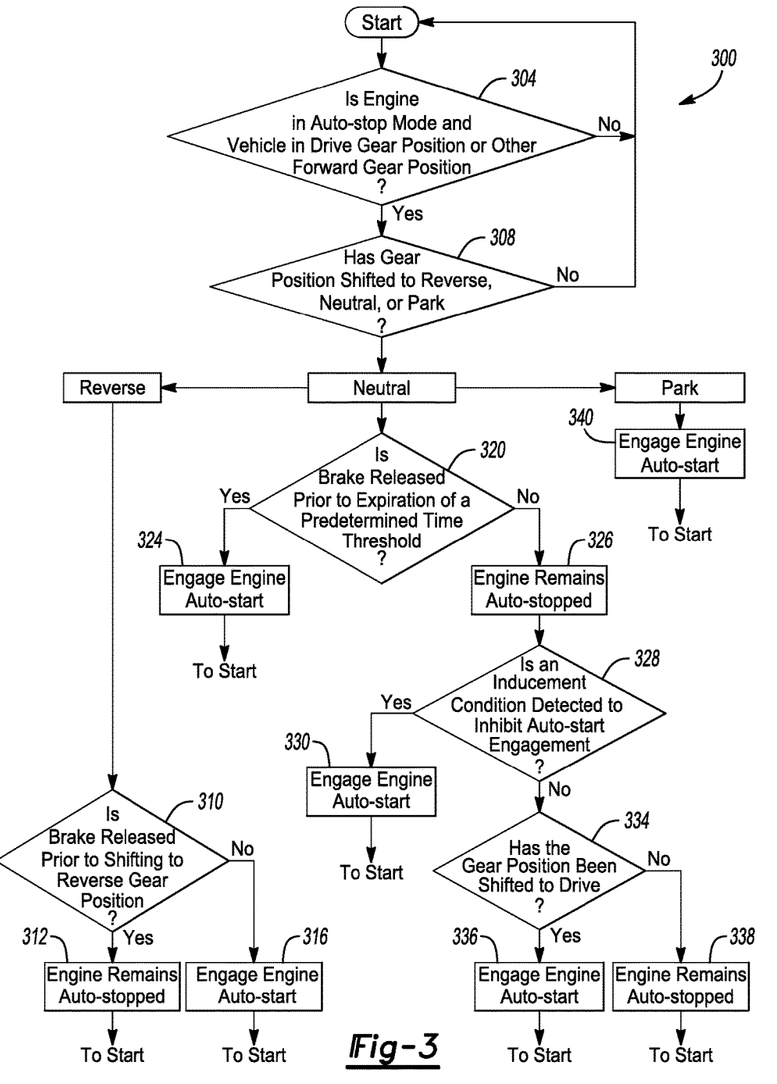
FIG. 3 is a flow chart illustrating another example of an algorithm to support engine auto start-stop operations of a vehicle.

FIG. 3 shows an example of another algorithm for initiating engine auto start-stop engine commands based on a detection of certain conditions, referred to as an algorithm 300 herein. The algorithm 300 may be used with various vehicle configurations such as a vehicle including a traditional PRNDL system, a non-pushbutton shift by wire system, and a push button shift by wire system.

The algorithm 300 may be representative of programming for a controller to operate engine start-stop of the vehicle. The controller may be in communication with various sensors monitoring conditions of vehicle components. For example, in operation 304 the controller may determine whether the engine is engaged in auto-stop mode and whether the vehicle is in a drive gear position or another forward-drive gear position. Examples of other forward drive gears include drive, sport, or any forward propulsion driving mode. In operation 308, the controller may determine whether a gear position has shifted from drive to reverse, neutral, or park. In the event a gear shift to reverse has occurred, the controller may determine whether a brake was released prior to shifting to reverse in operation 310. In operation 312, the controller may direct the engine to remain auto-stopped if the brake was released prior to the shift to reverse. In operation 316, the controller may direct the engine to auto-start if the brake was not released prior to the shift to reverse.

In the event the controller identified a shift to neutral in operation 308, the controller may then determine whether the brake is released prior to an expiration of a predetermined time threshold in operation 320. The predetermined time threshold may be calibratable or tunable. An example of the predetermined time threshold includes 200 or 300 milliseconds. The controller may direct the engine to auto-start in operation 324 if the brake was released prior to the expiration of the predetermined time threshold. The engine may direct the engine to remain auto-stopped in operation 326 if the brake is released after the expiration of the predetermined time threshold.

In operation 328, the controller may determine whether an inhibit or inducement condition is detected which inhibits auto-start engagement. For example, driver-independent inhibit conditions refer to those over which a vehicle operator has no direct control. Driver-independent inhibit conditions include, but are not limited to, ambient temperature being outside of a calibratable range, engine temperature being outside of an allowable range, transmission fluid temperature being outside of an allowable range, and a battery temperature being outside of an allowable range. If any or all of these conditions are satisfied, engine auto-stops may be automatically prevented by the vehicle controller 44.

As another example, driver-dependent inhibit conditions refer to those over which a driver may exert direct control. Driver-dependent inhibit conditions include, but are not limited to, vehicle climate control being active, accessory electric current draw exceeding an allowable threshold, a steering wheel turning angle exceeding an allowable threshold, and a brake pedal pressure being below an allowable threshold. If any or all of these driver-dependent conditions are satisfied, engine auto-stops may be automatically prevented by the vehicle controller 44.

The controller may direct the engine to auto-start in operation 330 if an inducement condition is detected. If no inducement condition is detected the controller may determine whether the gear position has been shifted to drive in operation 334. The controller may direct the engine to auto-start in operation 336 if the gear position has been shifted to drive. The controller may direct the engine to remain auto-stopped in operation 338 if the gear position has not been shifted to drive. In the event the controller identified a shift to park in operation 308, the controller may direct the engine to auto-start in operation 340.

FIG. 4 shows an example of a matrix of a control strategy for engine auto start-stop operations of a vehicle, referred to generally as a matrix 400. The matrix 400 includes pre-conditions 404 and current conditions 410 of the vehicle. The pre-conditions 404 may represent various examples of vehicle conditions while in a neutral gear position. The current conditions 410 may represent various examples of engine commands based on the vehicle shifting from the neutral gear position to another gear position and whether or not a brake is applied. A controller may monitor conditions of the vehicle to identify a status of the pre-conditions 404 and direct operation of an engine start-stop system in response thereto.

The pre-conditions 404 include a gear position status, and engine run condition status, and a brake condition status. The matrix 400 shows the gear position status to be a neutral gear position. The engine run condition status may indicate either a running status or an auto-stopped status. The brake condition status may indicate whether a brake is applied or released.

The current conditions 410 include a gear position status, a brake condition status, and two engine command columns. The gear position status indicates whether the vehicle has shifted from neutral to park, reverse, drive, sport, or whether the vehicle remains in neutral. The brake condition status indicates whether the brake is applied or released. The two engine command columns indicate whether the controller has directed the engine to auto-stop or auto-start based on whether a predetermined time threshold has expired. The predetermined time threshold may be calibratable or tunable. An example of the predetermined time threshold includes 200 or 300 milliseconds.

For example, in line item 1 the engine is in auto-stop mode with a neutral gear position and a brake applied. The controller may detect a shift to a park gear position while the brake application is maintained. In this example, the controller may direct the engine to remain in auto-stop mode based on the detection and regardless of whether the predetermined time threshold has expired. Line item 21 shows an example in which the engine is running with a neutral gear position and the brake is applied. The controller may detect a shift to the park gear position while the brake application is maintained. In response to the detection, the controller may direct the engine to remain running if the shift to park occurred prior to the expiration of the predetermined time threshold or may direct the engine to auto-stop in the event the shift to park occurred after expiration of the predetermined time threshold. Line item 35 shows an example in which the engine is running with a neutral gear position and the brake released. The controller may detect that the gear remains in neutral but the brake is subsequently applied. In response to the detection, the controller may direct the engine to remain running if the brake application occurred prior to the expiration of the predetermined time threshold or may direct the engine to auto-stop in the event the brake application occurred after expiration of the predetermined threshold.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A vehicle engine start-stop control method comprising:
responsive to presence of an engine auto-stop mode and a neutral gear position, outputting via a controller an engine command to auto-start the engine based on detection of a battery parameter being outside of a predetermined range, detection of a shift from neutral to another gear position, and determination of whether a predetermined time threshold has expired following the shift.

2. The method of claim 1, wherein outputting the engine command to auto-start the engine is further based on detection of movement of the vehicle in a reverse direction.

3. The method of claim 1, wherein the predetermined range is based on a battery state of charge, a battery temperature, a battery voltage, or a battery load current.

4. The method of claim 1, wherein outputting the engine command to auto-start the engine is further based on detection of a heating, ventilation, and air conditioning (HVAC) component activation.

5. The method of claim 4, wherein the HVAC component activation is activation of a max defrost command, a max heat command, a max air conditioning command, or a max blower speed command.

6. The method of claim 1, wherein outputting the engine command to auto-start the engine is further based on detection of a brake fault, a vehicle speed outside of a predetermined speed range, or a vehicle sensor fault.

7. The method of claim 1, wherein outputting the engine command to auto-start the engine is further based on detection of the vehicle rolling backward or detection of a high grade.

8. The method of claim 1, wherein the predetermined time threshold is 200 to 300 milliseconds.

9. A method to control engine start-stop in a vehicle comprising:
responsive to presence of an engine auto-stop mode and a forward drive gear position, outputting via a controller an engine command to auto-start or remain in auto-stop mode based on detection of a predetermined vehicle condition affecting fuel economy of the vehicle, detection of a shift from the forward drive gear position to another gear position, and determination of whether a predetermined time threshold has expired following the shift,
wherein the engine command is a remain in auto-stop mode command output responsive to detection of a brake application released prior to expiration of the predetermined time threshold and a shift to a neutral gear position, and wherein the engine command is an auto-start engine command output responsive to detection of an inhibit condition.

10. The method of claim 9, wherein the inhibit condition is one of an ambient temperature being outside of a predetermined calibratable range, an engine temperature being outside of a predetermined engine temperature range, a transmission fluid temperature being outside of a predetermined transmission temperature range, a battery temperature being outside of a predetermined battery temperature range, and a driver-dependent condition.

11. The method of claim 9 further comprising in response to not detecting an inhibit condition, outputting an auto-start engine command if the gear position has shifted to drive.

12. The method of claim 9, wherein the engine command is an auto-start command output in response to detection of a brake application released after the predetermined time threshold and a shift to a neutral gear position.

13. A vehicle comprises:
an engine;
a transmission for selectively coupling to the engine; and
a controller programmed to, in response to detecting whether a brake application extends beyond a predetermined time threshold, to detecting whether a gear selector is in a neutral gear position, and to detecting presence of an inducement condition, output an auto-start command to couple the transmission and engine.

14. The vehicle of claim 13, wherein the inducement condition is an ambient temperature being outside of a predetermined calibratable range, an engine temperature being outside of a predetermined engine temperature range, a transmission fluid temperature being outside of a predetermined transmission temperature range, a battery temperature being outside of a predetermined battery temperature range, or a driver-dependent condition.

15. The vehicle of claim 13, wherein the predetermined time threshold is 200 to 300 milliseconds.

16. The vehicle of claim 13, wherein the controller is further programmed to, in response to detection of a gear shift from the neutral gear to reverse or park, output an engine auto-start command.

* * * * *